United States Patent [19]

Bleckman

[11] Patent Number: 4,778,977
[45] Date of Patent: Oct. 18, 1988

[54] ELECTRICAL CONTINUOUS FLOW HEATER

[76] Inventor: Ingo Bleckman, Ignaz-Rieder-Kai 11, A-5020 Salzburg, Austria

[21] Appl. No.: 944,553

[22] Filed: Dec. 19, 1986

[30] Foreign Application Priority Data

Dec. 23, 1985 [DE] Fed. Rep. of Germany ... 8536338[U]

[51] Int. Cl.⁴ .......................... F24H 1/14; H05B 3/00; F28F 1/00; A47J 31/54
[52] U.S. Cl. ..................................... 219/283; 99/288; 99/307; 138/33; 138/115; 165/164; 219/301; 219/308
[58] Field of Search ............... 219/280, 283, 301, 302, 219/303, 305, 308, 535; 138/33, 115; 165/164; 99/281, 288, 302, 305, 306, 307

[56] References Cited

U.S. PATENT DOCUMENTS

| | | | |
|---|---|---|---|
| 2,773,513 | 12/1956 | Isenberg | 165/164 |
| 4,356,381 | 10/1982 | Flaherty et al. | 219/302 X |
| 4,558,204 | 12/1985 | Bleckmann | 219/283 |

FOREIGN PATENT DOCUMENTS

| | | | |
|---|---|---|---|
| 67932 | 4/1982 | European Pat. Off. | 219/283 |
| 2647152 | 4/1978 | Fed. Rep. of Germany | 219/301 |
| 2218796 | 2/1974 | Fed. Rep. of Germany | |
| 2903743 | 8/1980 | Fed. Rep. of Germany | 219/302 |
| 3345823 | 7/1985 | Fed. Rep. of Germany | 219/283 |
| 3424469 | 1/1986 | Fed. Rep. of Germany | 219/301 |
| 1427586 | 3/1976 | United Kingdom | 219/301 |

*Primary Examiner*—Anthony Bartis
*Attorney, Agent, or Firm*—Mallinckrodt & Mallinckrodt

[57] ABSTRACT

In an electrical continuous flow heater for an appliance such as a coffee machine, a tubular heater member has a jacket tube in heat conducting contact with a pipe for carrying the fluid to be heated, with the pipe and jacket tube disposed in horizontal side-by-side relationship. The jacket tube or the pipe, or both, have a wall thickness which varies over the periphery thereof, the thickest portion of the pipe wall being lowest in the horizontal position during use and the thickest portion of the jacket tube contacting the pipe. In one arrangement, the thickest portion of the tubular jacket and/or pipe is provided by a strip of sheet metal attached to such pipe or tubular jacket. In another arrangement, the pipe and jacket tube are constructed as a unitary extruded member.

8 Claims, 2 Drawing Sheets

4,778,977

ELECTRICAL CONTINUOUS FLOW HEATER

FIELD OF THE INVENTION

The present invention relates generally to an electrical continuous flow heater for appliances which involve heating a flow of fluid such as a coffee making machine, a dishwashing machine or similar appliances.

BACKGROUND OF THE INVENTION

Continuous flow heaters in which the medium to be heated, being in a domestic situation generally water, is heated in a flow pipe forming at least part of a conduit leading from one part of an appliance to another may comprise a tubular heater element which includes a jacket tube forming the tubular outer casing of the tubular heater element. The tubular heater element and the pipe may be in the form of a one-piece hollow member, as disclosed for example in German published specification (DE-AS) No. 22 18 796. Depending on the requirements encountered in a practical situation, the flow pipe and the jacket tube of the tubular heater element may be of different cross-sections, wherein the cross-sectional configuration involved may differ from a circular configuration, being for example elliptical.

Alternatively, a continuous flow heater may comprise the pipe for carrying the flow of fluid, such as water, and a tubular heater body which is joined thereto as by soldering or by another form of thermal bridge, for example a common mounting plate which is thus connected to both the through-flow pipe and the tubular heater body.

However, those alternative forms of construction tend to suffer from the same disadvantages, as follows:

At least half the heat generated by the tubular heater member, often the amount of heat involved is greater than half depending on the particular design configuration involved, flows into the region of the through-flow pipe which is above the centre line thereof. As the transfer of heat to a vapour-air space is poor, the fact that a substantial proportion of the heat generated by the tubular heater member flows into the part of the pipe which is above the centre line means that there is an increased amount of radiant heat lost from the pipe to the exterior. This correspondingly involves the loss of a considerable amount of thermal and accordingly electrical energy. In the case of continuous flow heaters, the heat requires to drive the column of water upwardly into a riser pipe produces a great amount of steam, which issues from the discharge opening of the riser pipe, and in so doing frequently generates unpleasant snorting noises. Experience with conventional coffee-making machines has indicated that it is often about one sixth of the amount of water introduced into the appliance that is converted into steam uselessly in that fashion. As less electrical energy is required for heating the water to boiling temperature than for vaporising the boiling water, there is a high level of energy consumption which is no longer acceptable under present-day conditions.

The aim therefore is to provide a construction in which the flow of heat from the tubular heater member to the through-flow pipe can be improved and the amount of energy radiated to the exterior from the tubular heater member can be reduced, and in which the greater part of the amount of heat given off to the through-flow pipe by the tubular heater member is transmitted from below to the column of water therein so that the formation of steam for example in a coffee making machine occurs at the bottom of the through-flow pipe, in the form of small bubbles which provide a corresponding upward force for driving the column of water out of the riser pipe, while avoiding a surge discharge of steam out of the steam space above the surface of the water.

OBJECTIVES OF THE INVENTION

Accordingly a principal objective of the present invention is to provide an electrical continuous flow heater which gives a higher level of heating efficiency.

Another objective of the present invention is to provide a continuous flow heater which has a lower level of energy consumption.

Still another objective of the present invention is to provide a continuous flow heater having a heater tube and a flow pipe in juxtaposed relationship, with an enhanced flow of heat from the heater tube to the flow pipe.

SUMMARY OF THE INVENTION

In accordance with the present invention, these and other objectives are attained by an electrical continuous flow heater comprising a tubular heater body having a jacket tube and a through-flow pipe for the flow of medium to be heated, in which the jacket tube and the through-flow pipe are connected in heat-conducting relationship, wherein either the jacket tube or the through-flow pipe or both is or are of a wall thickness varying over the periphery thereof. The jacket tube and the through-flow pipe may be connected in heat-conducting relationship by suitable means for providing a thermal bridge therebetween, or the jacket tube and the through-flow pipe may be connected as an integral component.

In a preferred feature the region of greatest wall thickness in the jacket tube of the tubular heater member is towards the through-flow pipe, while the greatest wall thickness of the through-flow pipe may be disposed at a location which is at the lowest point thereof in the installed condition of the heater in an appliance.

The jacket tube and the through-flow pipe may be formed by an extruded member affording first and second at least generally tubular ducts forming the interiors of the jacket tube and the through-flow pipe respectively.

A strip-like portion of, for example, sheet metal may be applied to the through-flow pipe and/or the jacket tube, extending over at least a part of the longitudinal extent thereof, thereby operatively simulating the increased wall thickness of the jacket tube or the through-flow pipe respectively.

THE DRAWINGS

In the drawings which illustrate a continuous-flow heater constituting the best mode presently contemplated for carrying out the invention with respect to two forms of heater:

FIG. 1 is a view of a continuous flow heater for a coffee-making machine, seen from below, FIG. 2 is a view on an enlarged scale in section of a first embodiment of the continuous flow heater, and FIG. 3 is a view similar to that shown in FIG. 2 of a second embodiment of the continuous flow heater.

FIG. 4, a view similar to that shown in FIG. 2 wherein the simulated increased wall thickness of the through-flow pipe is accomplished by a strip-like portion of sheet metal applied to the lowest point.

FIG. 5, a view similar to that shown in FIG. 2 wherein the simulated increased wall thickness of the jacket tube is accomplished by a strip-like portion of sheet metal applied towards the through-flow pipe.

DETAILED DESCRIPTION OF THE ILLUSTRATED EMBODIMENTS

Figure 1:
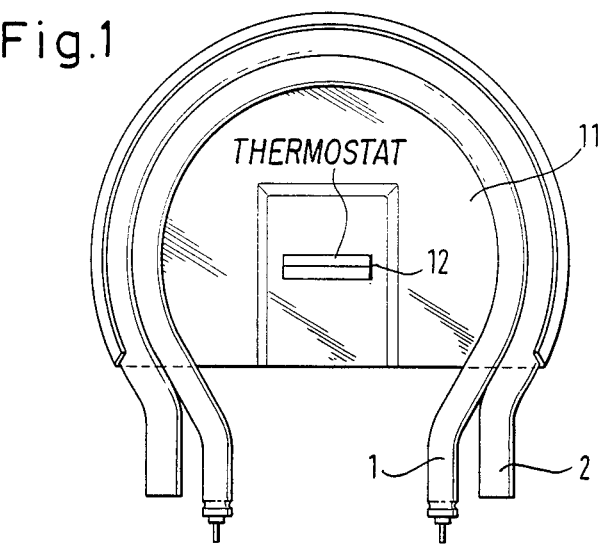

Referring firstly to FIG. 1, shown therein is the general configuration of a continuous flow heater comprising a tubular heater member, as indicated at 1, adapted to be horizontally disposed during use in side-by-side contacting relationship with a jacket tube 2. The tubular heater member is shown as bent in a part-circular configuration, with suitable electrical connecting means at respective ends thereof. The jacket tube 1 is connected, as by soldering, to through-flow pipe 2 at a connecting location, as indicated at 3 in FIG. 2. The through-flow pipe 2 thus carries a flow of fluid which is to be heated by the tubular heater member as the fluid flows through the through-flow pipe 2.

Figure 2:
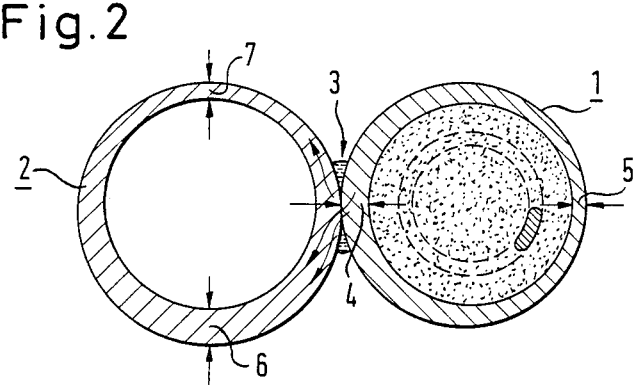

Referring now to FIG. 2, it will be seen therefrom that the jacket tube 1 of the tubular heater member is of a wall thickness or gauge which varies over the periphery thereof, more specifically in such a manner, as illustrated, that the greatest wall thickness of the jacket tube 2 occurs at the location indicated at 4, in the vicinity of the join 3, while the smallest wall thickness occurs at the location indicated at 5, which is diametrically opposite to the location 4. It will be noted that, although the outside surface and the inside surface of the tubular heater body are substantially circular, as illustrated, the centre points of the two circles are disposed at a spacing from each other, such that the centre point of the circle defined by the inside surface of the jacket tube is at a greater spacing from the through-flow pipe 2, than the centre point of the circle defined by the outside surface of the jacket tube 1.

In consequence, in operation of the arrangement illustrated for example in FIG. 2, a greater amount of heat flows through the region of the jacket tube 1 which is of greater wall thickness, to the through-flow pipe 2, than at the side of the jacket tube 1 which is remote from the through-flow pipe 2, in comparison with a design configuration in which the jacket tube is of a constant wall thickness.

It will be seen from FIG. 2 that the through-flow pipe 2 is of a similar configuration to that just described above in relation to the jacket tube 1, but with the difference that the greatest wall thickness of the through-flow pipe 2 occurs at the region 6 which is at the lowest point in the installed condition of the arrangement, while the smallest wall thickness occurs at the location indicated at 7 which is thus diametrically opposite to the location 6 and therefore at the highest point in the installed condition of the arrangement. That provides that the greater part of the heat transferred from the tubular heater member to the through-flow pipe 2 flows into the lower region thereof and is transmitted thereby to the column of water in the through-flow pipe 2. The flow of heat upwardly to the location 7 which is of the smallest wall thickness is reduced on the other hand so that less heat is transmitted to the vapour space in the pipe, in comparison with a known construction having a constant wall thickness.

Figure 3:
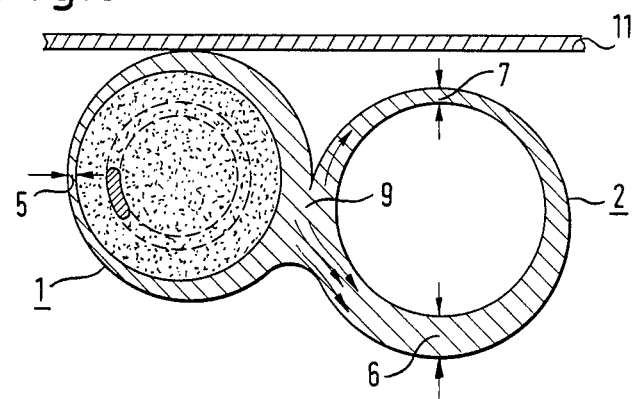
Figure 4:
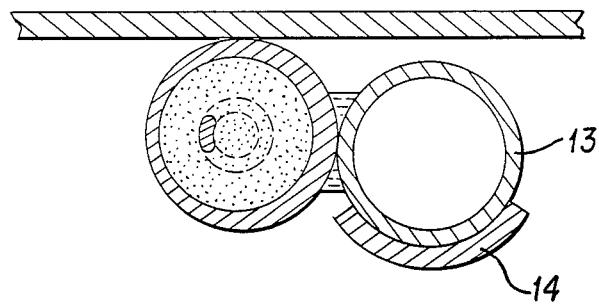

Referring now to FIG. 3, in the construction illustrated therein the jacket tube 1 of the tubular heater member and the through-flow pipe 2 are formed by a single extruded or continuously cast member. The jacket tube 1 and the pipe 2 are in heat-conducting relationship by virtue of the presence of the integral connecting location 9 between the jacket tube 1 and the pipe 2, where the flow of heat from the region of the tubular heater jacket tube 1 which is of the greatest wall thickness is conducted into the region of the pipe 2 which is of the greatest wall thickness, being once again at the lowest point of the arrangement in the installed condition thereof.

As indicated above, FIG. 1 shows the general configuration of the continuous flow heater, being disposed in this embodiment under a plate 11 for supporting for example a coffee pot in a coffee-making machine, reference numeral 12 denoting a thermostat which provides for temperature control.

In the case of the embodiment illustrated in FIG. 3, the jacket tube 1 of the tubular heater member is connected by way of the top surface thereof to the support plate 11 so that a coffee pot which is set down on the plate 11 and the liquid contained in the coffee pot are thus kept suitably hot by the heat transmitted from the jacket tube 1 through the support plate 11 to the coffee pot. On the other hand, it will be clearly seen from FIG. 3 that the pipe 2 is kept at a spacing from the support plate 11, at the underneath surface thereof. That ensures on the one hand that there is therefore a good flow of heat from the tubular heater member to the support plate 11 while on the other hand ensuring that the greater part of the heat generated by the tubular heater member flows into the lower region of the pipe 2 and cannot be transmitted thereby to the support plate 11, which would result in a loss of heat in the pipe 2. In this illustrated embodiment, the tubular heater member is on the outside. The greater length thereof, due to the structural relationship adopted, means that it can be operated with a higher level of heating output. During the flow of water through the arrangement, the thermostat 12 illustrated symbolically in FIG. 1 controls the water temperature. When the flow of water has ceased or in the event of defective operation, when there is no water in the through-flow pipe, the thermostat responds to the temperature of the tubular heater member.

The arrangement may be pressed, for example, to compact the insulating material in the tubular heater member, into a different form, for example, a triangular form in respect of the tubular heater member and an upwardly tapering form in respect of the through-flow pipe. A drop-shaped cross-section is found to be particularly advantageous.

Furthermore, although in the illustrated constructions both the through-flow pipe and the jacket tube of the tubular heater member have wall thicknesses which vary over the circumference thereof, advantages are already achieved by making just the through-flow pipe or just the tubular heater jacket tube with a wall thickness which varies as specified.

In a modified arrangement, in order further to enhance the transfer of heat to the body of water in the through-flow pipe 2, an inwardly projecting web or limb portion may be fitted to the region 6 of the through-flow pipe 2, which is of the greatest wall thickness therein.

Figure 5:
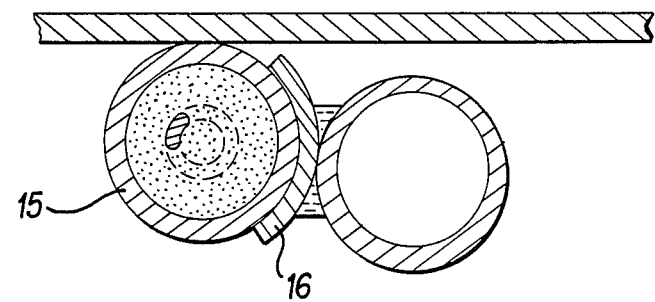

In addition, it would be possible for a strip of, for example, sheet metal which is flat or curved in itself to be fitted to the through-flow pipe 13, as shown at 16, FIG. 5, and/or to the jacket tube 1, with the strip extending over a part of the longitudinal dimension of the tube or pipe to which it is fixed, or alternatively extending over the entire longitudinal dimension thereof. The attached strip of sheet metal can thus operatively simulate the region of greater wall thickness, by virtue of being applied to the circumferential surface of the jacket tube or of the pipe. The attached strip of sheet metal may be adopted for use in the arrangement according to the invention, even where the wall thickness of the jacket tube or the pipe to which the strip of metal is fitted is already of a circumferentially varying wall thickness.

It will be appreciated that, whereas this invention is here illustrated and described with specific reference to embodiments thereof presently contemplated as the best mode of carrying out such invention in actual practice, various changes may be made in adapting the invention to different embodiments without departing from the broader inventive concepts disclosed herein and comprehended by the following claims.

I claim:

1. An electrical continuous-flow heater for an appliance, comprising a pipe for carrying the medium to be heated, and a tubular heater member having a jacket tube, the pipe and jacket tube being disposed in side-by-side relationship in a generally horizontal plane during use, said pipe having a wall thickness which varies over the periphery thereof, with the lowest portion of the pipe wall being the thickest portion, and the jacket tube having a wall thickness which varies over the periphery therof and being joined in side-by-side direct heat conductive contacting relationship with said pipe, the thickest portion of the jacket tube wall being at the contacting joinder with said pipe.

2. A heater as set forth in claim 1, wherein the least wall thickness of said pipe is below the uppermost outer surface of the jacket tube.

3. A heater as set forth in claim 1, wherein said jacket tube and said pipe are formed by a wholly integral member having first and second ducts therein corresponding to the interiors of said jacket tube and said pipe, respectively.

4. A heater as set forth in claim 1, wherein the outside surface of each of said jacket tube and said pipe is substantially circular and the inside surface thereof is also circular but so disposed in eccentric relationship with respect to the outside surface that the centers of respective circles defined by the outside surface and the associated inside surface, respectively, are spaced from each other.

5. A heater as set forth in claim 1, wherein the thickest portion of the pipe is provided by a strip of sheet metal attached to said pipe and extending over at least a part of the longitudinal extent thereof, thereby to operatively simulate the increased wall thickness thereof.

6. A heater as set forth in claim 1, wherein the thickest portion of the jacket tube is provided by a strip of sheet metal attached to said tube and extending over at least a part of the longitudinal extent thereof, thereby to operatively simulate the increased wall thickness thereof.

7. A heater as set forth in claim 1, wherein the thickest portion of the pipe is provided by a strip of sheet metal attached to said pipe and extending over at least a part of the longitudinal extent thereof, thereby to operatively simulate the increased wall thickness thereof, and wherein the thickest portion of the jacket tube is provided by a strip of sheet metal attached to said tube and extending over at least a part of the longitudinal extent thereof, thereby to operatively simulate the increased wall thickness thereof.

8. A heater as set forth in claim 1, including a plate arranged to be horizontally disposed above said jacket tube and said pipe during use and being in contact with said jacket tube but in spaced relationship with said pipe.

* * * * *